(12) United States Patent
Nishiyama et al.

(10) Patent No.: US 6,769,255 B2
(45) Date of Patent: Aug. 3, 2004

(54) VARIABLE NOZZLE OPENING CONTROL SYSTEM FOR AN EXHAUST TURBINE SUPERCHARGER

(75) Inventors: Toshihiko Nishiyama, Oyama (JP); Hiroshi Sugito, Oyama (JP); Takahisa Iino, Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 10/402,066

(22) Filed: Mar. 27, 2003

(65) Prior Publication Data

US 2003/0182940 A1 Oct. 2, 2003

(30) Foreign Application Priority Data

Mar. 29, 2002 (JP) ........................................ 2002-097668
Aug. 1, 2002 (JP) ........................................ 2002-224603

(51) Int. Cl.⁷ ............................................ F02D 23/00
(52) U.S. Cl. ...................................................... 60/602
(58) Field of Search ................... 60/600–603; 123/559.1

(56) References Cited

U.S. PATENT DOCUMENTS 4,779,423 A * 10/1988 Szczupak ..................... 60/602
5,996,347 A * 12/1999 Nagae et al. ................. 60/602
6,062,025 A * 5/2000 Okada et al. ................. 60/602
2003/0084886 A1 * 5/2003 Akao et al. ............... 123/559.1
2003/0121263 A1 * 7/2003 Hidaka ........................ 60/602

FOREIGN PATENT DOCUMENTS

| EP | 1081352 A1 | * 3/2001 | ........... F02B/37/24 |
| JP | 60040730 A | * 3/1985 | ........... F02B/37/12 |
| JP | 63-005117 | 1/1988 | |

* cited by examiner

*Primary Examiner*—Thomas Denion
*Assistant Examiner*—Thai Ba Trieu
(74) *Attorney, Agent, or Firm*—Frishauf, Holtz, Goodman & Chick, P.C.

(57) ABSTRACT

An opening of the variable nozzle of the exhaust turbine supercharger is set to and maintained at the maximum value in the constant operating state when the load is not more than a prespecified load level. The opening is gradually made smaller, when the load is not less than the specified load level, as the load becomes greater. When the load shifts from the high load region to the low load region, the variable nozzle is mere closed or maintained at the original opening, and when the operating state get close to the surging limit, the variable nozzle is more opened. When shifting from the low load region to the high load region, or when sifting from low speed to high speed, the variable nozzle is opened mace, and then closed to return to the constant operating state.

4 Claims, 16 Drawing Sheets

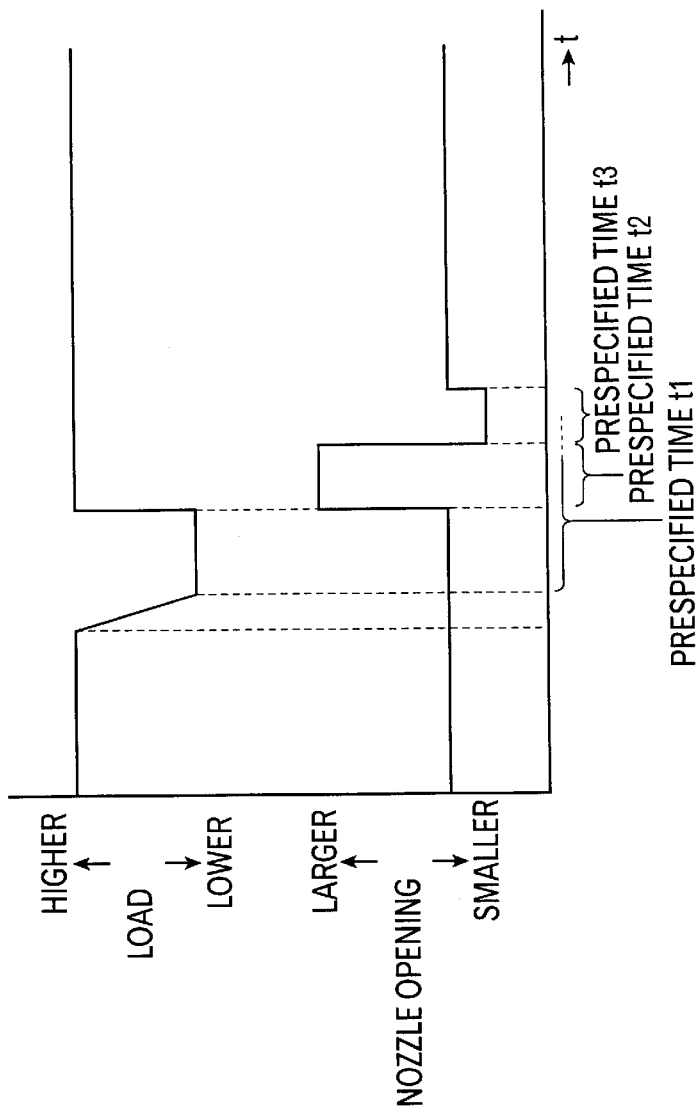

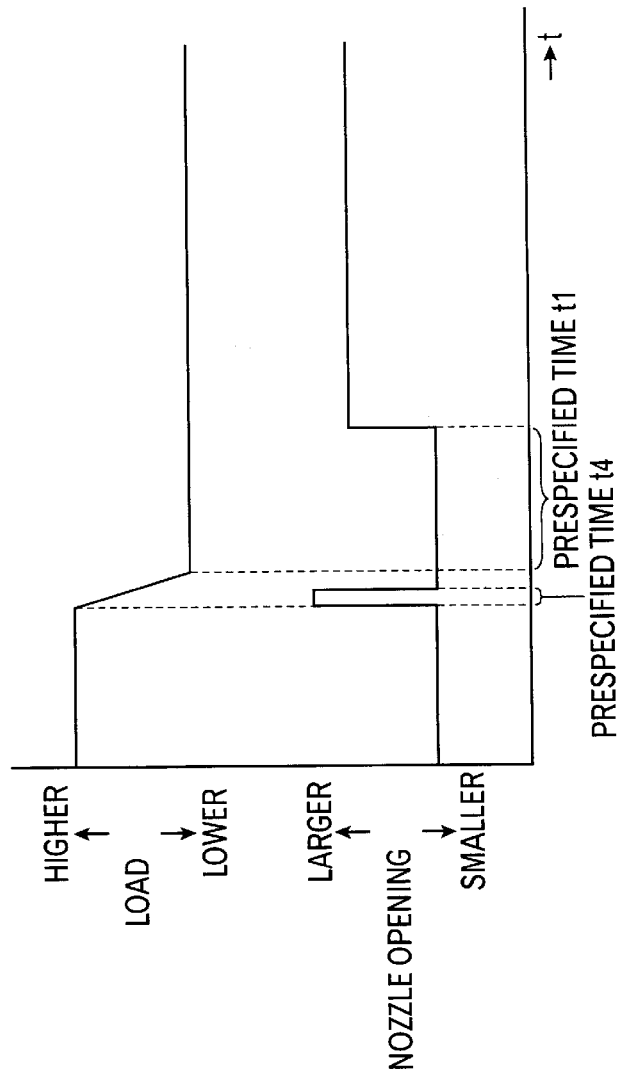

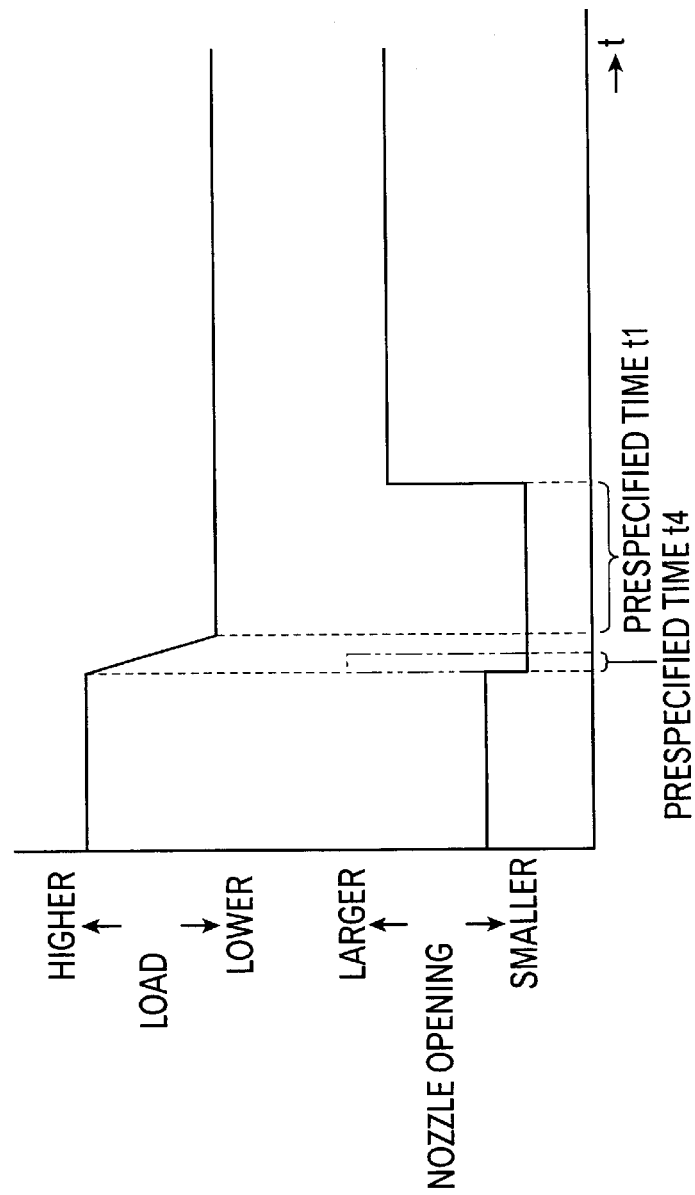

VARIABLE NOZZLE OPENING CONTROL SYSTEM FOR AN EXHAUST TURBINE SUPERCHARGER

BACKGROUND OF THE INVENTION

1. Field of the Invention

The present invention relates to a variable nozzle opening control system for an exhaust turbine supercharger which is provided in an internal combustion engine, compresses intake air, and supplies the compresses intake air to the internal combustion engine.

2. Description of Related Art

There has been known an exhaust turbine supercharger as a device for supercharging intake air to an internal combustion engine. The exhaust turbine supercharger comprises a turbine provided in an exhaust gas conduit of an internal combustion engine and a compressor provided in an intake air conduit, drives the exhaust turbine with an exhaust gas from the internal combustion engine, and compresses the intake air by driving the compressor with this driving force.

In some of the exhaust turbine superchargers, an opening of a nozzle section of the exhaust turbine is variable so that a supercharging pressure can be controlled. In this type of exhaust turbine supercharger, a movable nozzle vane is provided in the nozzle section which is a section for introducing an exhaust gas from the exhaust turbine, and an opening of the nozzle section is controlled by moving this nuzzle vane. When the nozzle vane is throttled to reduce the opening of the nozzle section, a flow rate of the exhaust gas introduced into the exhaust turbine becomes higher and the energy received by the exhaust turbine increases, so that the supercharging pressure can be raised. The nozzle vane is generally controlled according to the load, and for instance, the inlet port pressure (exhaust pressure) is compared to the outlet port pressure (boost pressure), and the nozzle vane is opened or closed according to the difference (or the ratio).

In control of a nozzle vane for an exhaust turbine supercharger used in a diesel engine for a truck or a bus, an opening of the nozzle vane is minimized in the low load mode. However, when the opening of the nozzle section is made smaller in the low load mode, a flow rate of the air flowing into the internal combustion engine becomes higher, and the air intake resistance increases, so that the pumping loss in the diesel engine becomes larger, so that the fuel consumption rate disadvantageously increases.

On the other hand, as described in Japanese Patent Laid-Open Publication No. 63-5117, when the opening of the nozzle vane is maximized in the low load mode, although the pumping loss is suppressed, there occurs the problem that responses of the nozzle vane to the transitional situation associating changes in load or speed become slower. Especially when the exhaust turbine supercharger is used, for instance, in a diesel engine for a construction machine, the load largely changes, and deceleration and re-acceleration are frequently repeated, so that improvement in response speed in the transitional situation is very important.

SUMMARY OF THE INVENTION

It is an object of the present invention to provide a variable nozzle opening control system for an exhaust turbine supercharger with a low fuel consumption rate in the low load mode and a high response speed in the transitional situation.

The variable nozzle opening control system according to the present invention comprises a nozzle opening adjuster capable of adjusting an opening of a variable nozzle for an exhaust turbine supercharger, a load detector for detecting a load of an internal combustion engine to which the exhaust turbine supercharger is connected, and a control unit for controlling operations of the nozzle-opening adjuster, and the control unit is previously set so that an opening of the variable nozzle is substantially maximized when the internal combustion engine runs in the low load region and also the opening of the variable nozzle is gradually reduced in association with increase in the load when the internal combustion engine runs in the high load region where the load of the internal combustion engine is higher than a preset level, and also so that, after the load of the internal combustion engine shifts from the high load region to the low load region, an opening of the variable nozzle for the original high load region is preserved or reduced for a first prespecified period of time and then set to a preset value after the first prespecified period of time has passed.

With the present invention based on the configuration as described above, an opening of a variable nozzle is controlled in the so-called constant operation mode of an internal combustion engine, in which no change occurs in load of the internal combustion engine, so that it is substantially maximized in the low load region and gradually made smaller in association with increase of the load when the load is not less than a first preset load level, and because of this configuration, the optical supercharging pressure can be maintained in various operation modes. Especially, in the low load region, pumping loss in the internal combustion engine is reduced with the fuel consumption rate reduced.

When shifting from the high load region to the low load region, as an opening of the variable nozzle is maintained at the original value in the high load region or at a smaller opening as compared to the original value for a first prespecified period of times even if a high load is reloaded during this first prespecified period of time, the supercharging pressure is maintained at a high level, so that the response speed in the transitional situation is quite excellent. The present invention is useful especially when it is used in a diesel engine for a construction machine or the like in which load change occurs frequently.

A variable range of an opening of a variable nozzle is decided by taking into considerations such factors as the performance of an exhaust turbine supercharger or an internal combustion engine. Therefore, the gate area of the nozzle section when the variable nozzle is fully opened or fully closed is decided according to a range in which an opening of the variable nozzle is variable.

The prespecified load is employed when the supercharging pressure is required to be raised, and is previously decided taking into considerations, a range in which the opening of the variable nozzle is variable, a range of the performance of an exhaust turbine superchargers or an allowable operating range of the internal combustion engine.

In the present invention, it is preferable to provide a rotation speed detector for detecting a rotation speed of an internal combustion engine, and the control unit preferably controls preferably provide controls so that, when the load of the internal combustion engine shifts from the high load region to the low load region, or when the rotation speed of the internal combustion engine shifts from the high speed side to the low speed side, the opening of the variable nozzle is enlarged for a second prespecified period of time, or until the rotation speed of the internal combustion engine drops to a first prespecified rotation speed, or until the load of the internal combustion engine drops to a second prespecified load level.

When the load of an internal combustion engine shifts from the high load region to the low load region, or when the load of an internal combustion engine shifts from the high speed side to the low speed side, if an opening of a variable nozzle of the exhaust turbine supercharger is kept as it is, or is changed to a smaller side, sometimes the operating region of the compressor may get closer to exceed the surging limit in some shift patterns of the load or speed. When the operating region of the compressor exceed the surging limit, vibrations of the exhaust turbine supercharger or noises due to the vibrations become larger, and in that case operations of the exhaust turbine supercharger may become unstable.

In the present invention based on the configuration as described above, when the exhaust turbine supercharger is used under the conditions where the situation as described above may occur, the control unit provides controls so that an opening of the variable nozzle is made larger, immediately after the load of the internal combustion engine is shifted from the high load region to the low load region or from the high speed side to the low speed side, for the second prespecified period of time, or until the rotation speed of the internal combustion engine drops to a first prespecified rotation speed, or until the load of the internal combustion engine drops to a second prespecified load level, so that the operating region of the compressor never reaches the surging limit during shift to the low load region side or to the low speed side, which insures stable operation.

In the present invention, the control unit preferably provides controls so that an opening of the variable nozzle is made larger within the first prespecified period of time, when the load of the internal combustion engine again shifts from the low load region to the high load region, or when the rotation speed of the internal combustion engine again shifts from the low speed side to the high speed side, for a third prespecified period of time, or until the rotation speed of the internal combustion engine reaches a second prespecified rotation speed, or until the load of the internal combustion engine reaches a third prespecified load level, and also so that, after the third prespecified period of time has passes, or after the second prespecified rotation speed is reached, or after the load of the internal combustion engine has reached the third prespecified load level, the opening is set to a preset value.

In diesel engines or the like for construction machines, it often occurs that the load of an internal combustion engine is shifted from the high load region to the low load region, or from the high speed side to the low speed side, and immediately after that the operating mode is again shifted to the high load region or to the high speed side. In this step, if an opening of the variable nozzle is kept at the original value for high load or high speed operation, an opening of the nozzle section of the exhaust turbine supercharger is smaller as compared to that required for actual operations and the back pressure of the internal combustion engine excessively rises. In this case, efficiency of the exhaust turbine substantially drops, or combustion is not performed smoothly because the exhaust gas is not discharged well.

In the present invention based on the configuration described above, when the operating mode of an internal combustion engine again shift to the high load mode or to the high speed region within the first prespecified period of time, the control unit provides controls so that an opening of a variable nozzle is made larger for the prespecified period of time, or until the rotation speed of the internal combustion engine reaches the second prespecified rotation speed, or until the load of the internal combustion engine reaches the third prespecified load level, and therefore abnormal increase of the back pressure is prevented, so that combustion is carried out smoothly and the response speed in the transitional situation is improved.

In the present invention, the control unit preferably provides controls so that an opening of a variable nozzle is made larger, when the load of the internal combustion engine again shifts from the low load mode to the high load mode or the rotation speed of the internal combustion engine again shifts from the low speed region to the high speed region within the first prespecified period of time, for the third prespecified period of time, or until the rotation speed of the internal combustion engine reaches the second prespecified rotation speed, or until the load of the internal combustion engine reaches the third prespecified load, and also so that, after the third prespecified period of time has passed, or after the second prespecified rotation speed is reached, or after the third prespecified load is reached, the opening of the variable nozzle is made smaller for a fourth prespecified period of time, or until the third prespecified rotation speed is reached, or until a fourth prespecified load is reached, and further so that, after the fourth prespecified period of time has passed, or after the third prespecified rotation speed is reached, or after the fourth prespecified load is reached, the opening is set to a prespecified value.

In the present invention based on this configuration, when the operating mode of the internal combustion engine again shifts from the high load mode or to the high speed region within the first prespecified period of time, an opening of a variable nozzle is made larger to prevent abnormal increase of the back pressure in the internal combustion engine for the third prespecified period of time, or until the rotation speed of the internal combustion engine reaches the second prespecified rotation speed, or until the load of the internal combustion engine reaches the third prespecified load, but then the opening is made smaller for the fourth prespecified period of time, or until the third rotation speed is reached, or until the fourth specified load is reached, and because of the operations, the supercharging pressure becomes higher, and the response speed in the transitional speed is further improved without causing abnormal increase of the back pressure.

BRIEF DESCRIPTION OF THE DRAWINGS

FIG. 11 is a view showing an opening of the variable nozzle when the diesel engine according to the second embodiment of the present invention again shifts from the low load mode to the high load mode;

FIG. 12 is a view showing an opening of the variable nozzle when the diesel engine according to the third embodiment of the present invention shifts from the high load mode to the low load mode;

FIG. 13 is a view showing a variant of an opening of the variable nozzle according to each of the embodiments of the present invention above;

DETAILED DESCRIPTION OF PREFERRED EMBODIMENT(S)

Figure 1:
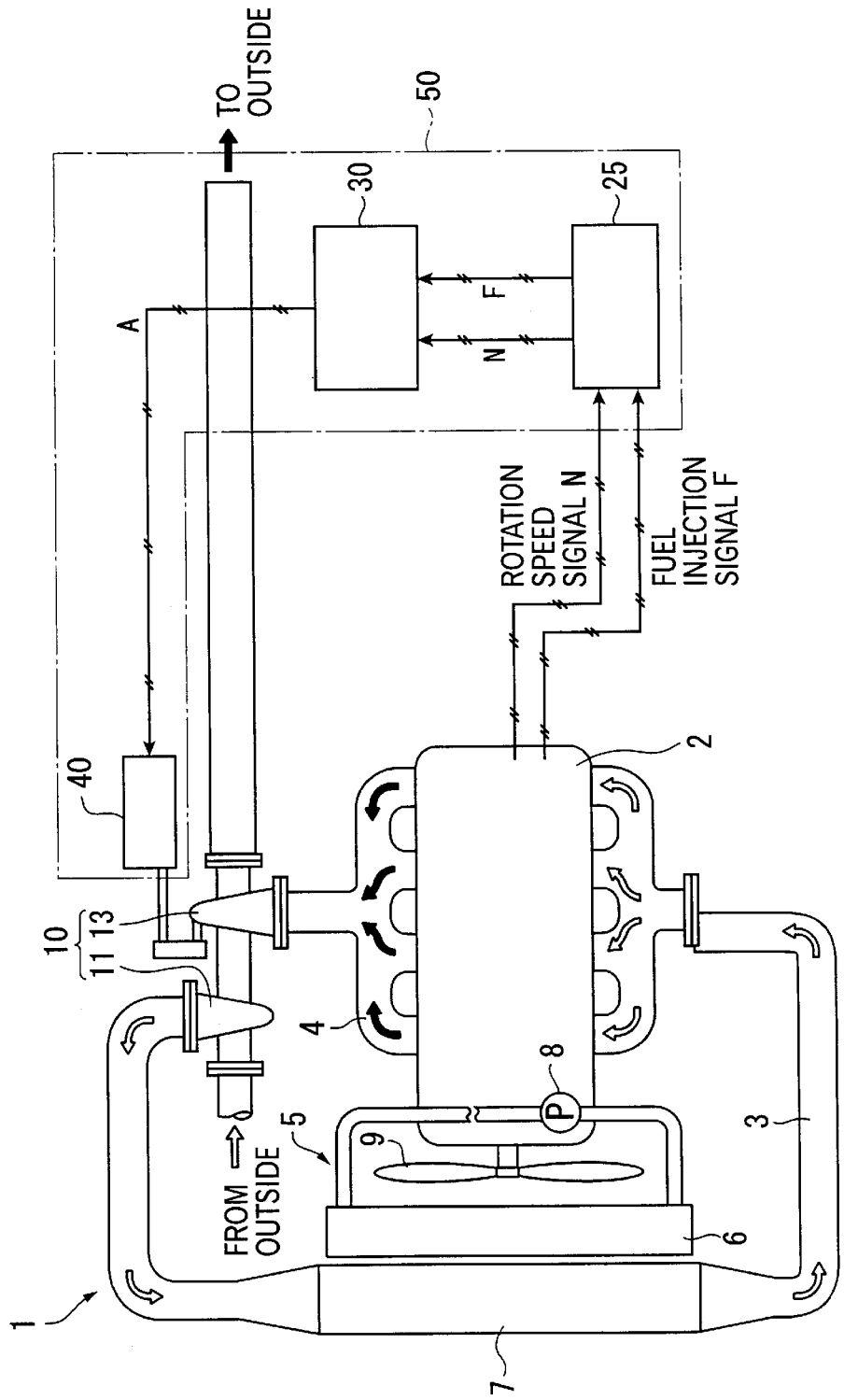
FIG. 1 is a general block diagram showing a system of a diesel engine according to a first embodiment of the present invention.

Embodiments of the present invention are described below with reference to the drawings. It is to be noted that the same reference numerals are assigned to the same components in each of the embodiments and description thereof is simplified or emitted herefrom.

[First Embodiment]

FIG. 1 shows a system of a diesel engine as an internal combustion engine according to a first embodiment of the present invention.

In this figure, the diesel engine 1 comprises a engine body 2 having a plurality of combustion chambers (four chambers in this embodiment) formed therein; an intake air conduit 3 for introducing intake air into the combustion chambers; an exhaust gas conduit 4 for discharging an exhaust gas to the outside; a cooling mechanism 5 for cooling the diesel engine 1; an exhaust turbine supercharger 10 for compressing intake air for supercharging; an adjuster 4C as a nozzle opening control unit for adjusting an opening of a variable nozzle in the exhaust turbine supercharger 10; an engine controller 25 for controlling operations of the diesel engine 1; and a nozzle opening controller 30 as a control unit for controlling operations of the adjuster 40.

In this embodiment, the adjuster 40, engine controller 25, and nozzle opening controller 30 forms a nozzle opening controlling system 50.

The cooling mechanism comprises a pump 8 driven, for instance, by a crank shaft (not shown) accommodated in the engine body 2, and cooling water fed by the pump 8 cools required portions of the basic body 2 of the diesel engine 1, exhaust turbine supercharger 10, an oil cooler, or other components not shown, and then air-cooled by a radiator 6 provided in the cooling mechanism 5. Also an intercooler 7 for cooling air compressed by the exhaust turbine supercharger 10 is provided in the intake air conduit 3.

This radiator 6 and the intercooler 7 are provided in the engine body 2, and the cooling action is promoted by a fan 9 rotated and driven by a crank shaft or the like.

Figure 2:
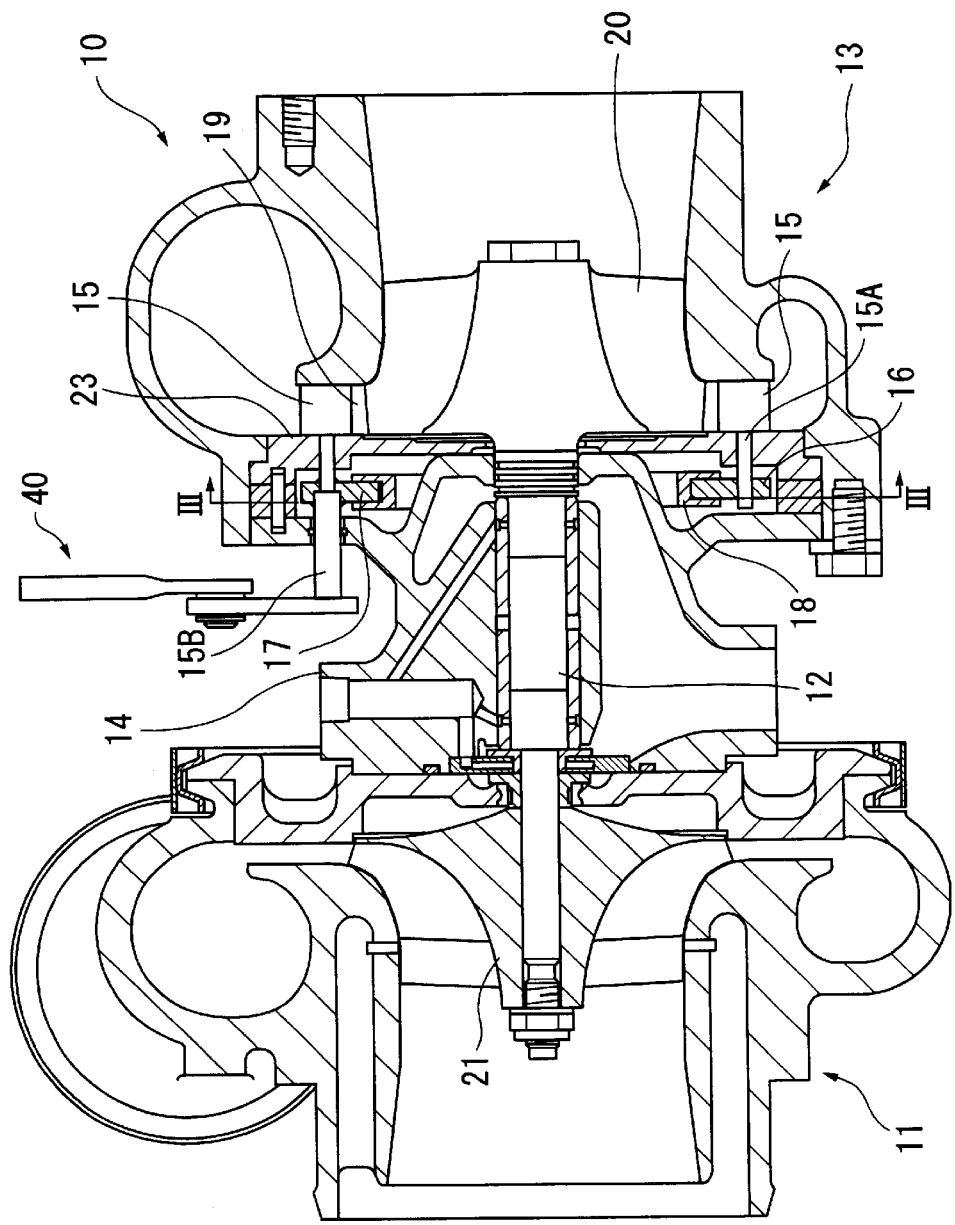
FIG. 2 is a cross-sectional view showing an exhaust turbine supercharger according to the first embodiment of the present invention as a whole.

The exhaust turbine supercharger 10 comprises an exhaust turbine 13 provided in the exhaust gas conduit 4 and a compressor 11 provided in the intake air conduit 3. As shown in FIG. 2, the exhaust turbine 13 has a turbine wheel 20 rotated by an incoming exhaust gas, and the compressor 11 has an impeller 21 which compresses an intake air by rotating. The turbine wheel 20 and the impeller 21 are connected to each other with a shaft 12, and are rotatably supported by a housing 14.

The exhaust turbine 13 comprises a plurality of variable nozzles 15 each for adjusting a gate area of a nozzle section 19 for introducing an exhaust gas therefrom along the outer periphery of the turbine wheel. Each of the variable nozzles 15 has a link mechanism capable of adjusting a gate area of the nozzle section with the adjuster 40.

Figure 3:
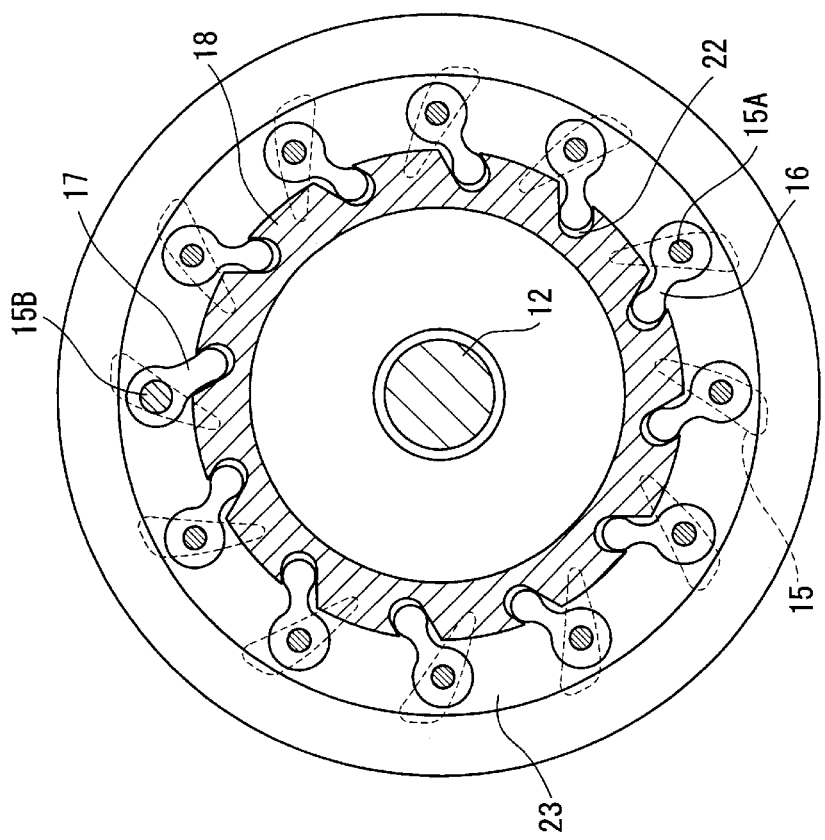
FIG. 3 is a cross-sectional view taken along the line III—III in FIG. 2.

As shown in FIG. 3, the variable nozzles 15 are arranged with an even space from each other along an outer periphery of the turbine wheel 20, and revolving shafts 15A of the variable nozzles 15 are rotatably supported penetrating a plate 23 forming a portion of the nozzle section 19.

Provided inside of the area surrounded by the revolving shafts 15A provided on the periphery is a linkage ring 18 which can rotate concentrically with the shaft 12. Half-long engagement holes 22 are formed along the outer periphery of this linkage ring 18, and an edge of a rod-formed lever 16 is rotatably and also slidably engaged in each of the engagement holes 22. Another edge of each lever 16 is fixed to each of the revolving shaft 15A, and the linkage ring 18 is supported by the revolving shafts 15A via the levers 16.

One of the plurality of revolving shafts 15A is a revolving drive shaft 15B also penetrating the housing 14. Also of the levers 16, those connected to the revolving drive shaft 15B are driving levers 17.

The rotary revolving shaft 15B penetrates the housing 14 and is pivotably supported thereby, and the penetrating section is sealed with a simple ring-formed seal member. Further the rotary revolving shaft 15B has a diameter larger than those of other revolving shafts 15A, and also has the rigidity. Because of this feature, the revolving drive shaft 15B has the rigidity sufficient for revolving the linkage ring 18 to which all of the revolving shafts 15A are connected via the lever 17 for driving. The lever 17 for driving is larger and has higher rigidity as compared to other levers 16 so that it can deliver the revolving drive force from the revolving drive shaft 15B to the linkage ring 18.

The revolving drive shaft 15B as described above is connected to the adjuster 40 provided outside the housing 14.

The adjuster 40 is electrically connected to the nozzle opening controller 30, and drives the revolving drive shaft 15B according to an instruction from the nozzle opening controller 30. The adjuster 40 may be based on a hydraulic pressure or an air pressure.

A variable range of a gate area of the nozzle section 19 is decided by a revolving range of the variable nozzle 15, and the revolving range is previously set by taking into considerations a supercharging capability range of the exhaust turbine supercharger 10 or an allowable operating range of the diesel engine 1. In this embodiment, as for the revolving range of the variable nozzle 15, an angle at which a gate area of the nozzle section 19 is maximum is defined as the fully opened, and an angle at which the gate area is minimum within the operating range of the diesel engine 1 or the supercharging capability range of the exhaust turbine supercharger 10 is defined as fully closed. Therefore, in this embodiment, even if the variable nozzle 15 is fully closed, the gate area of the nozzle section 19 is not zero.

The engine controller 25 is provided to control a fuel injection rate for the engine body 2, and as shown in FIG. 1, and receives a rotation speed signal N obtained by detecting a rotation speed of the crank shaft in the engine body 2 or a fuel injection signal F as a load signal. The engine controller 25 grasps the operating speed of the diesel engine 1 by checking these signals, and provides controls such as adjustment of a fuel injection rate according to the operating state. Further the engine controller 25 is electrically connected to the nozzle opening controller 30, and sends the rotation speed signal N and the fuel injection signal F to the nozzle opening controller 30. Therefore, in this embodiment, this engine controller 25 plays roles of a rotation speed detector and a load detector in this invention.

Figure 4:
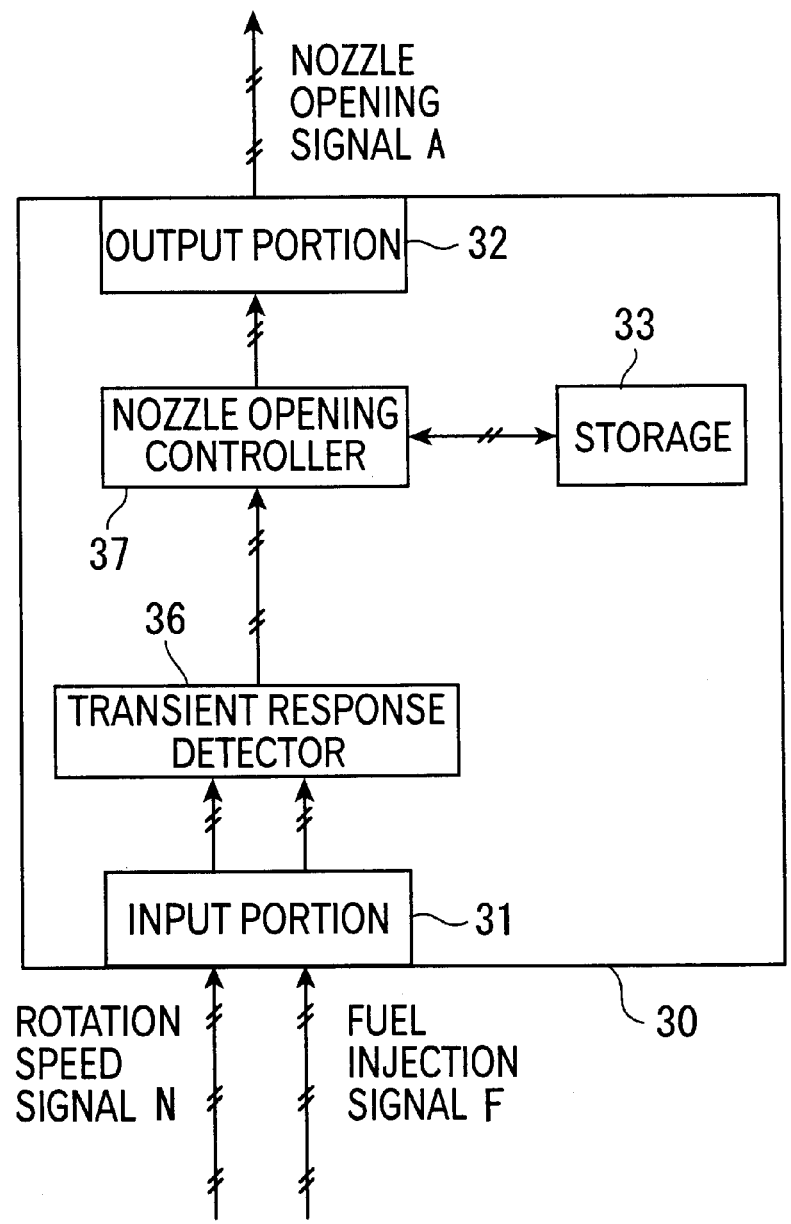
FIG. 4 is a block diagram showing a nozzle opening controller according to the first embodiment of the present invention.

The nozzle opening controller 30 comprises, as shown in FIG. 4, an input section 31 for receiving various types of signals from the engine controller 25, a transitional state response determination section 36 for determining depending on the signals from the input section 31 whether the operating mode of the diesel engine 1 is shifting from the high load mode to the low load mode or not, a storage section 33 for storing therein optimal opening values for the variable nozzle 15 corresponding to the expected input signals from the input section 31 respectively as a form or a map or a table, a nozzle opening control section 37 for deciding an optimal opening of the variable nozzle 15 according to the information stored in the storage section 33, and an output section 32 for receiving an instruction for setting an opening from the nozzle opening control section 37 and outputting the instruction to the adjuster 40.

Figure 8:
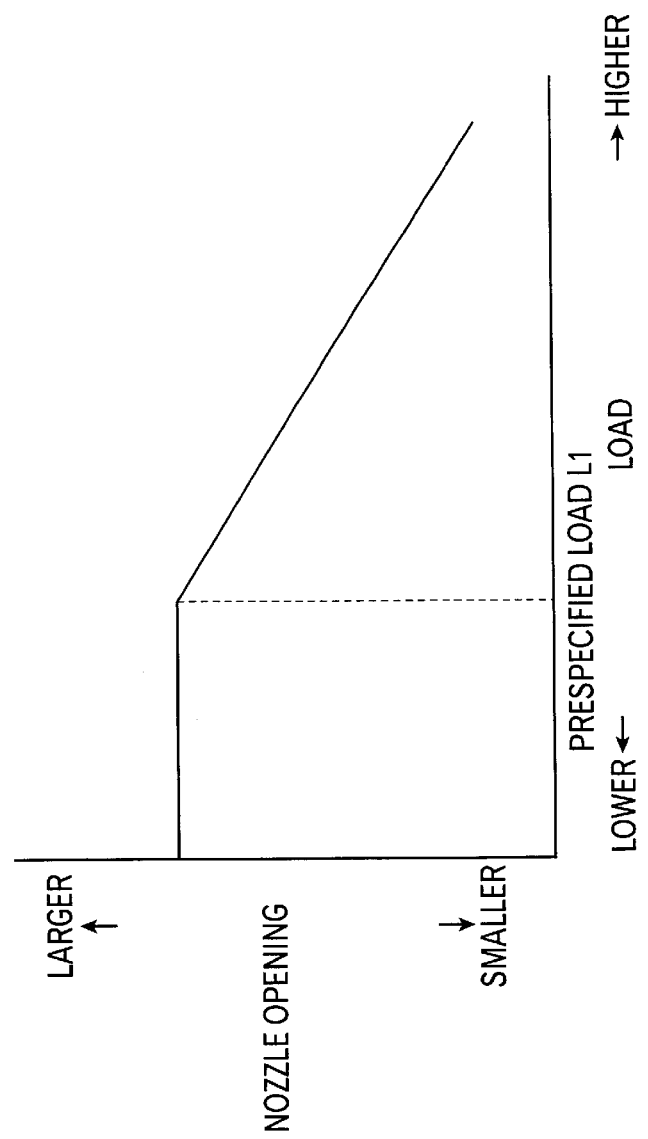
FIG. 8 is a view showing an opening of a variable nozzle when the diesel engine according to the present invention runs in the constant operating state.

The storage section 33 stores therein a map M in which values each for an opening of the variable nozzle 15 corresponding to the operating state of the diesel engine 1 are stored. In the map M according to this embodiment, optimal values each for an opening of the variable nozzle 15 in the so-called constant operating state, in which load of the diesel engine 1 changes little, are defined with a function concerning a relation between the rotation speed N and the fuel injection rate F. According to the values stored in this map M, as shown in FIG. 8, an opening of the variable nozzle 15 is substantially fully opened when the load of the diesel engine 1 is in the low load region and is not more than the prespecified load value, and an opening of the variable nozzle 15 is gradually made smaller, when the actual load is not less than a first prespecified load value L1, as the load becomes higher.

The diesel engine 1 having the configuration as described above runs as described below.

At first, when the diesel engine 1 is actuated, the exhaust turbine supercharger 10 rotates the turbine wheel 20 with an exhaust gas and further rotates the impeller 21 connected thereto via the shaft 12 for supercharging to the engine body 2. Engine controller 25 grasps the operating state of the engine body 2 depending on signals such as the rotation speed signal N and the injection rate signal F for the engine body 2, and sends the rotation speed signal N and the fuel injection rate F to the nozzle opening controller 30.

The nozzle opening controller 30 receives an incoming signal from the engine controller 25 with its input section 31. The nozzle opening controller 30 decides an optimal opening of the variable nozzle 15 in each operating mode of the diesel engine 1 in response to the incoming signal.

Figure 5:
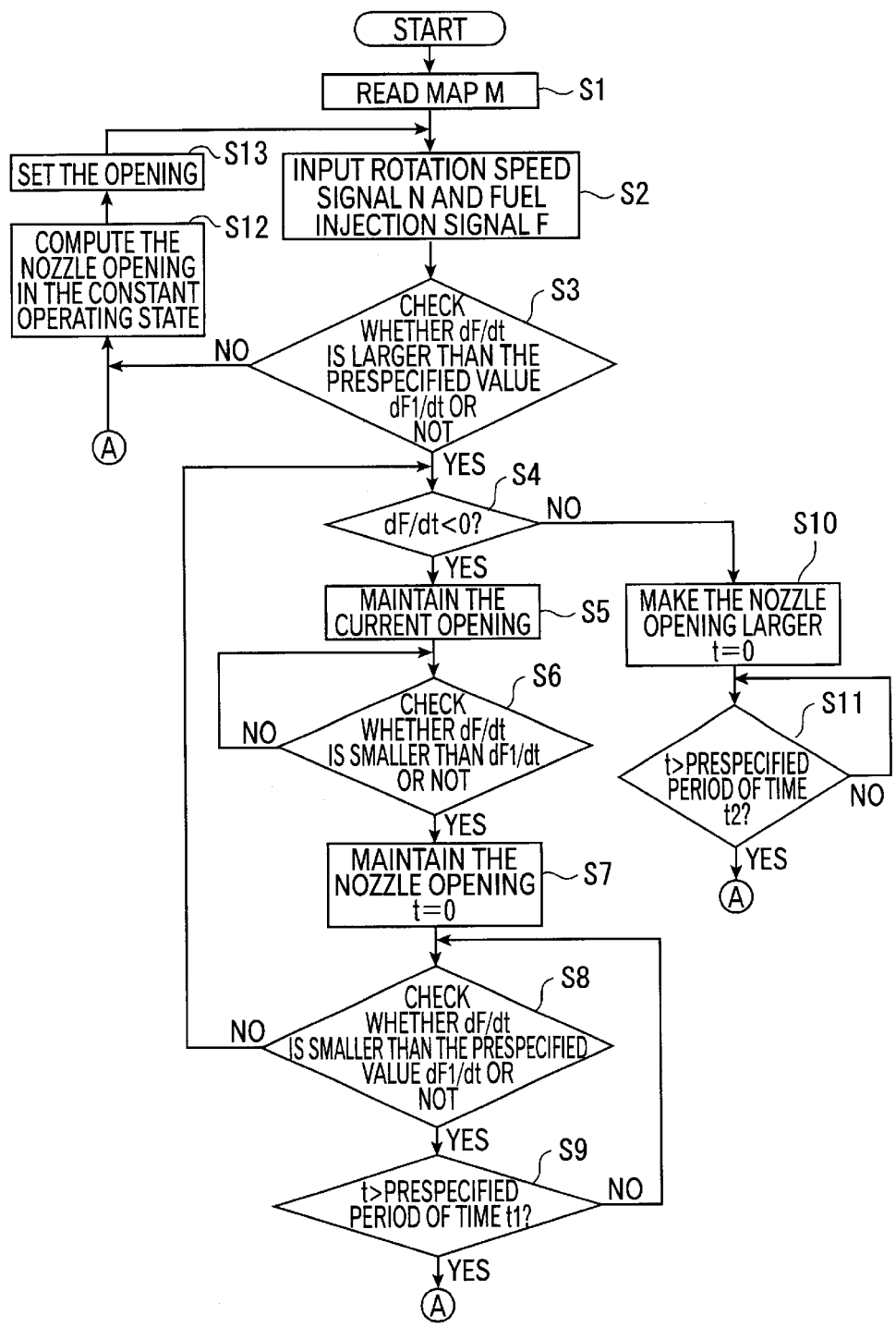
FIG. 5 is a flow chart showing controls for adjusting an opening of a variable nozzle according to the first embodiment of the present invention.

FIG. 5 shows a flow chart showing controls over an opening of the variable nozzle 15 in the first embodiment of the present invention.

In this figure, the nozzle opening control section 37 reads data in the map M from the storage section 33 in step S1. In step S2, the input section 31 receiving the rotation speed signal N and the fuel injection signal F from the engine controller 25 inputs data. In step S3, the transitional response determination section 36 receives these signals, and determines whether fluctuation in the fuel injection rate, namely the absolute value of the absolute value of the load change dF/dt has not reached the prespecified value dF1/dt or not. When it is determined that the load change dF/dt has reached the prespecified value dF1/dt, the transitional response determination section 36 determines that the diesel engine 1 is now running in the constant operating state where the load fluctuates little, sends a signal to instruct controls for the constant operating state to the nozzle opening control section 37, and then goes to step S12.

The nozzle opening control section 37 receives the signal from the transitional response determination section 36 and computes the nozzle opening corresponding to the load (fuel injection rate) as well as to the rotation speed in step S12, and outputs an instruction for a prespecified revolving angle of the variable nozzle 15 required to change the nozzle opening to the output section 32 in step S13. The output section 32 sends a nozzle opening signal A if or revolving the variable nozzle 15 by the prespecified angle to the adjuster 40.

The adjuster 40 receives the nozzle opening signal A from the output section 32 at the nozzle opening controller 30, and revolves the revolving drive shaft 15B by the specified angle. This driving force is delivered to the lever 17 for driving fixed to the revolving drive shaft 15B, and revolves the linkage ring 18 engaging with the lever 17 for driving. When the linkage ring 18 revolves, all of the other levers 16 engaging with the linkage ring 18 revolve like the lever 17 for driving, and as a result, all of the variable nozzles 15 connected to the levers 16 and levers 17 for driving are simultaneously revolved by the same angle. Thus an opening of the variable nozzle 15 is changed to adjust a gate area of the nozzle section 19.

In step S3, when the absolute value of the load change dF/dt is larger than the prespecified value dF1/dt, the transitional response determination section 36 determines that the operating mode of the diesel engine 1 is not in the constant operating state, and goes to step S4. In step S4, determination is made as to whether the load change dF/dt is negative or not. When it is determined that the load change dF/dt is negative, it is determined that the operating mode of the diesel engine 1 is shifting from the high load mode to the low load mode, and the transitional response determination section 36 sends a signal for controls in the transitional state to the nozzle opening control section 37, and goes to step S5.

In step S5, the nozzle opening control section 37 receives the signal from the transitional response determination section 36, outputs an instruction for maintaining an opening of the variable nozzle 15 at the original opening value in the high load mode to maintain the current opening of the variable nozzle 15. In this state, in step S6, the transitional response determination section 36 monitors the load change dF/dt depending on the fuel injection signal F from the input section 31, and maintains the current opening of the variable nozzle 15 until the absolute value of this load change dF/dt becomes smaller than the prespecified value dF1/dt. When the absolute value of the load change dF/dt reaches the prespecified value dF1/dt, transitional response determination section 36 sends a signal indicating that the operating mode of the diesel engine 1 has shifted from the high load mode to the low load mode to the nozzle opening control section 37, and goes to step S7.

In step S7, the nozzle opening control section 37 receives a signal from the transitional response determination section 36, set an incorporated timer to 0 (zero), and still maintain the opening of the variable nozzle 15 at the original opening value in the high load mode. In order to maintain the opening for a prespecified period of time t1 as a prespecified first period of time, in step S9, the time for maintaining the opening is monitored, and when the time t reaches the prespecified period of time t1, the nozzle opening control section 37 terminates the control for an opening of the variable nozzle 15 during shift of the operating mode of the diesel engine 1 from the high load mode to the low load mode, goes to step S12, and then sets the opening of the variable nozzle 15 for the constant operating state as described above.

Figure 9:
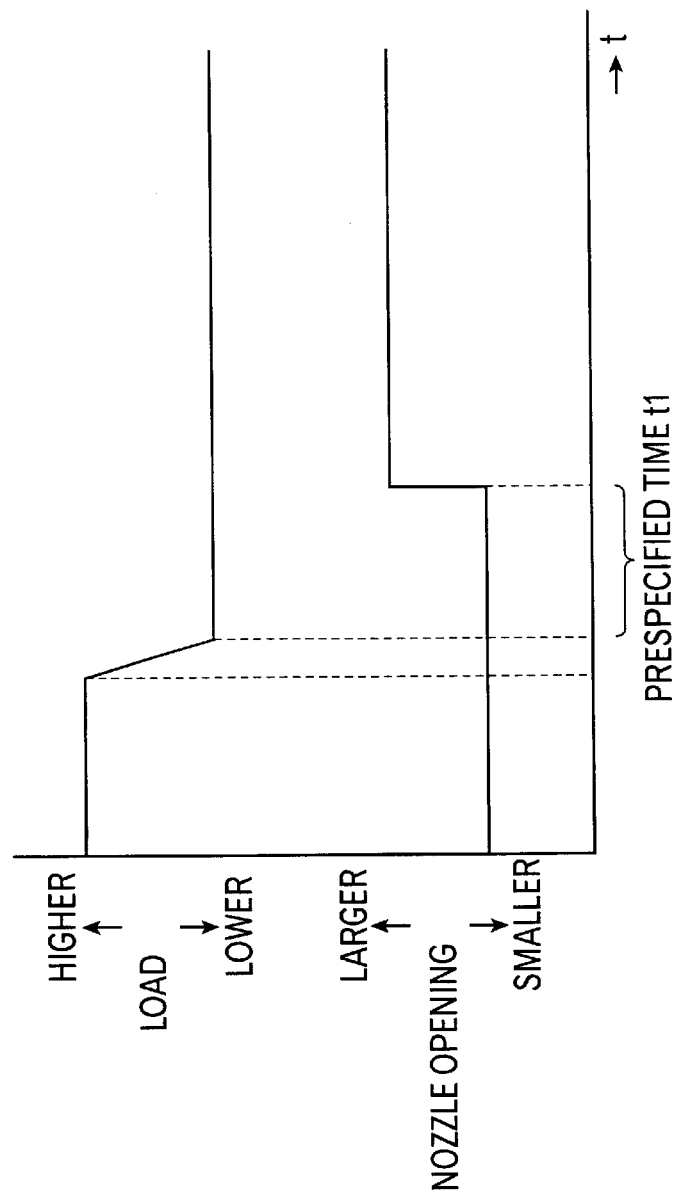
FIG. 9 is a view showing an opening of the variable nozzle when the diesel engine according to the first embodiment of the present invention shifts from the high load mode to the low load mode.

With the controls as described above, an opening of the variable nozzle 15 changes as shown in FIG. 9.

In step S8, while the nozzle opening control section 37 maintains the opening of the variable nozzle 15 for the prespecified period of time t1, whether the load changes occur again or not is monitored. In this step S8, the transitional response determination section 36 monitors the load change dF/dt depending on the fuel injection signal F from the input section 31, and when the absolute value of the load change dF/dt reaches the prespecified value dF1/dt, the transitional response determination section 36 sends a signal indicating that the operating mode of the diesel engine 1 has again entered the transitional response mode to the nozzle opening control section 37, and returns to step S4.

In step S4, while the nozzle opening control section 37 maintains the opening of the variable nozzle 15 at the original opening value in the high load mode, namely when the load again changes within the prespecified period of time t1, whether the load change dF/dt is negative or not is determined in this step S4. When it is determined that the load change dF/dt is negative, the nozzle opening control section 37 again goes to step S5, and maintained the current opening of the variable nozzle 15. When it is determined that the load change dF/dt is positive, the transitional response determination section 36 sends, after the operating mode of the diesel engine 1 shifts from the high load mode to the low load mode, a signal indicating that the operating mode of the diesel engine 1 again shifts to the high load mode to the nozzle opening control section 37, and goes to step S10.

In step S10, the nozzle opening control section 37 receives a signal from the transitional response determination section 36 and set the opening of the variable nozzle 15 to the maximum value, and also sets the incorporated timer to 0 (zero). In step S11, the nozzle opening control section 37 monitors the time t for maintaining the opening of the variable nozzle 15. When this maintaining time t reaches a prespecified period of time t2 as a third prespecified period of time, the nozzle opening control section 37 terminates the control required when the load becomes higher during shift from the high load mode to the low load mode, goes to step S12, and set the opening of the variable nozzle 15 in the constant operating state as described above.

Figure 10:
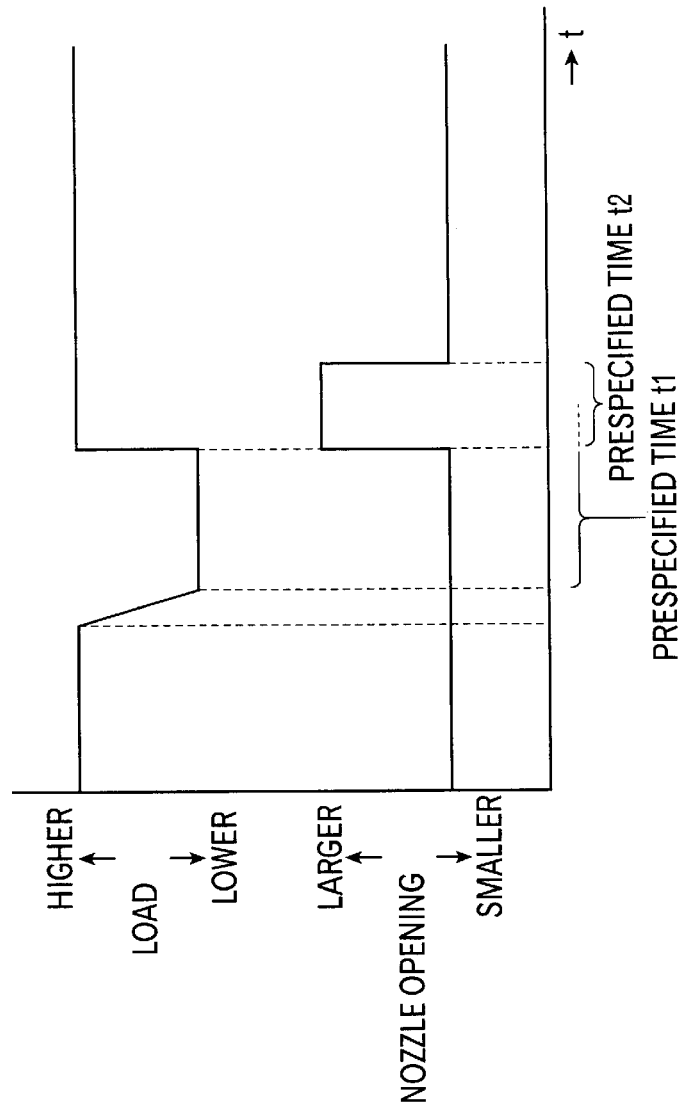
FIG. 10 is a view showing an opening of the variable nozzle when the diesel engine according to the first embodiment of the present invention again shifts from the low load mode to the high load mode.

With the controls as described above, the opening of the variable nozzle 15 changes as shown in FIG. 10.

It is to be noted that, if it is determined in step S3 the absolute value of the load change dF/dt is larger than the prespecified value dF1/dt and the transitional response determination section goes to step S4, and when the load change dF/dt is positive, the operating mode of the diesel engine 1 is shifting from the low load mode to the high load mode in the constant operating state, but also in this case, the system control goes to step S10, and the nozzle opening control section 37 fully opens the variable nozzle 15 for the prespecified period of time t2, and then sets the opening of the variable nozzle 15 in the constant operating state.

By providing the controls as described above repeatedly, the operating mode of the diesel engine 1 is kept in the optimal state.

With the first embodiment of the present invention, the following advantages are provided.

(1) In the constant operating state where the load change dF/dt of the diesel engine 1 is low, an opening of the variable nozzle 15 is changed according to a load and a rotation speed so that an opening of the variable nozzle 15 is set to the maximum value in the low load region in which the load is not more than a prespecified load L1 and also so that the opening is gradually made smaller at the load higher than the prespecified load L1 as the load becomes higher, and because of this feature, the pumping loss of the engine body 2 is reduced in the low load mode with the fuel consumption rate reduced, and a gate area of the exhaust turbine supercharger can be set to the optimal value with the efficiency improved when the load is not less than the prespecified load value.

(2) When the operating mode of the diesel engine 1 is shifting from the high load mode to the low load mode, an opening of the variable nozzle 15 is kept at the original opening value in the high load mode in the transitional situation and then for the prespecified period of time t1, so that a high supercharging pressure can be maintained even if the higher load is required during this period, and the response speed can be maintained in the transitional state. The control as described above is especially useful, for instance, for an exhaust turbine supercharger used under the conditions where a range of load change is relatively large and the variable nozzle 15 is fully closed when the load changes from the high load region to the low load region.

(3) Even when a higher load is again required during shift of the operating mode of the diesel engine 1 from the high load mode to the low load mode, as the variable nozzle 15 is fully opened for the prespecified period of time t2 and then the opening of the variable nozzle 15 is set to an optimal value corresponding to the load and the rotation speed, and because of the feature, abnormal increase of the back pressure in the diesel engine 1 can be prevented with the combustion performed smoothly, and the response speed in the transitional state where the load shifts from the low load region to the high load region can be improved.

A second embodiment of the present invention is described below.

[Second Embodiment]

Figure 6:
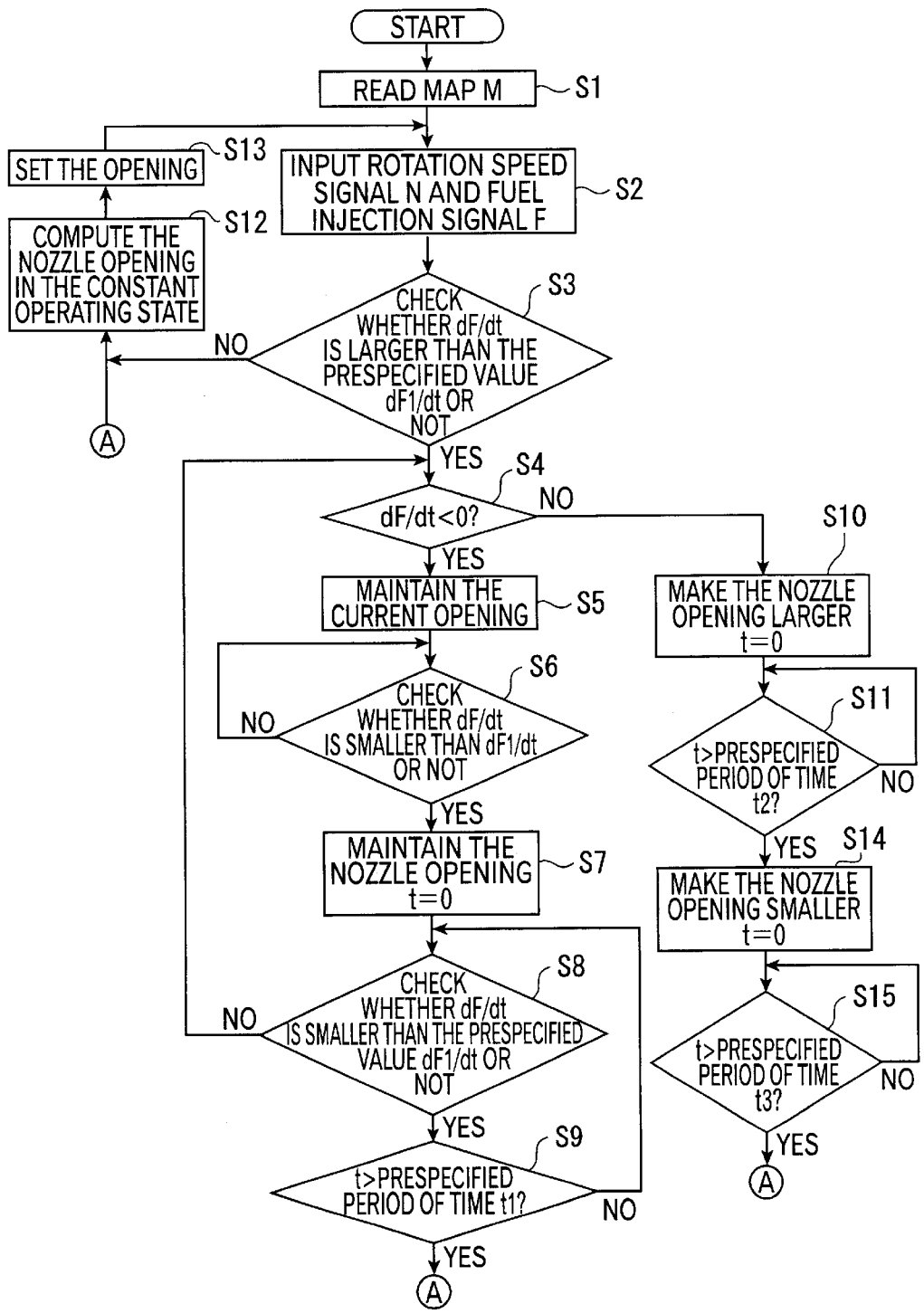
FIG. 6 is a flow chart showing controls for adjusting an opening of a variable nozzle according to a second embodiment of the present invention.

The second embodiment of the present invention is different from the first embodiment in the controls provided when a load change from the low load mode to the high load mode is required. FIG. 6 is a flow chart showing an opening control for a variable nozzle according to the second embodiment.

In this figure, the case where it is determined in step S4 that the load change dF/dt is positive is a case where a higher load is again required while the opening of the variable nozzle 15 is maintained at the original opening value in the high load mode, or a case where a higher load is required during shift from the low load region to the high load region in the constant operating state. In this case, system control goes to step S10 and step S11, and the nozzle opening control section 37 sets an opening of the variable nozzle 15 to the maximum value for the prespecified period of time t2 like in the first embodiment. Then system control goes to step S14, and the nozzle opening control section 37 resets the incorporated time to 0 (zero), and outputs an instruction for fully closing the opening of the variable nozzle 15 to the minimum value. With this control, the opening of the variable nozzle 15 is set to the minimum value. In step S15, an opening of the variable nozzle 15 is monitored for the prespecified period of time t in which the opening should be kept at the minimum value. When the period of time during which the opening of the variable nozzle 15 is maintained at the minimum value reaches the prespecified period of time t3 as a fourth prespecified period of time, the nozzle opening control section 37 terminates controls over an opening of the variable nozzle 15 when the load shifts from the low load region to the high load region, returns to step S12, and sets the opening of the variable nozzle 15 to that in the constant operating state.

With the controls as described above, the opening of the variable nozzle 15 changes as shown in FIG. 11.

With the second embodiment of the present invention as described above, in additions to the advantages described in (1), (2), and (3) in the first embodiment, the following advantages are provided.

(4) During shift from the high load mode to the low load mode, if a higher load is required, an opening of the variable nozzle 15 is set to the maximum value for the prespecified period of time t2, and then the opening of the variable nozzle 15 is set to the minimum value for the prespecified period of time t3, so that abnormal increase of the back pressure in the diesel engine 1 is prevented with the response speed improved, and in addition by setting the opening of the variable nozzle 15 to the minimum value, the supercharging pressure is raised with the response speed further improved. The controls as described above are especially useful for an exhaust turbine supercharger used for a long period of time under the conditions where transitional state continues for a long time, for instance, during shift from the low load region to the high load region.

Next a third embodiment of the present invention is described below.

[Third Embodiment]

Figure 7:
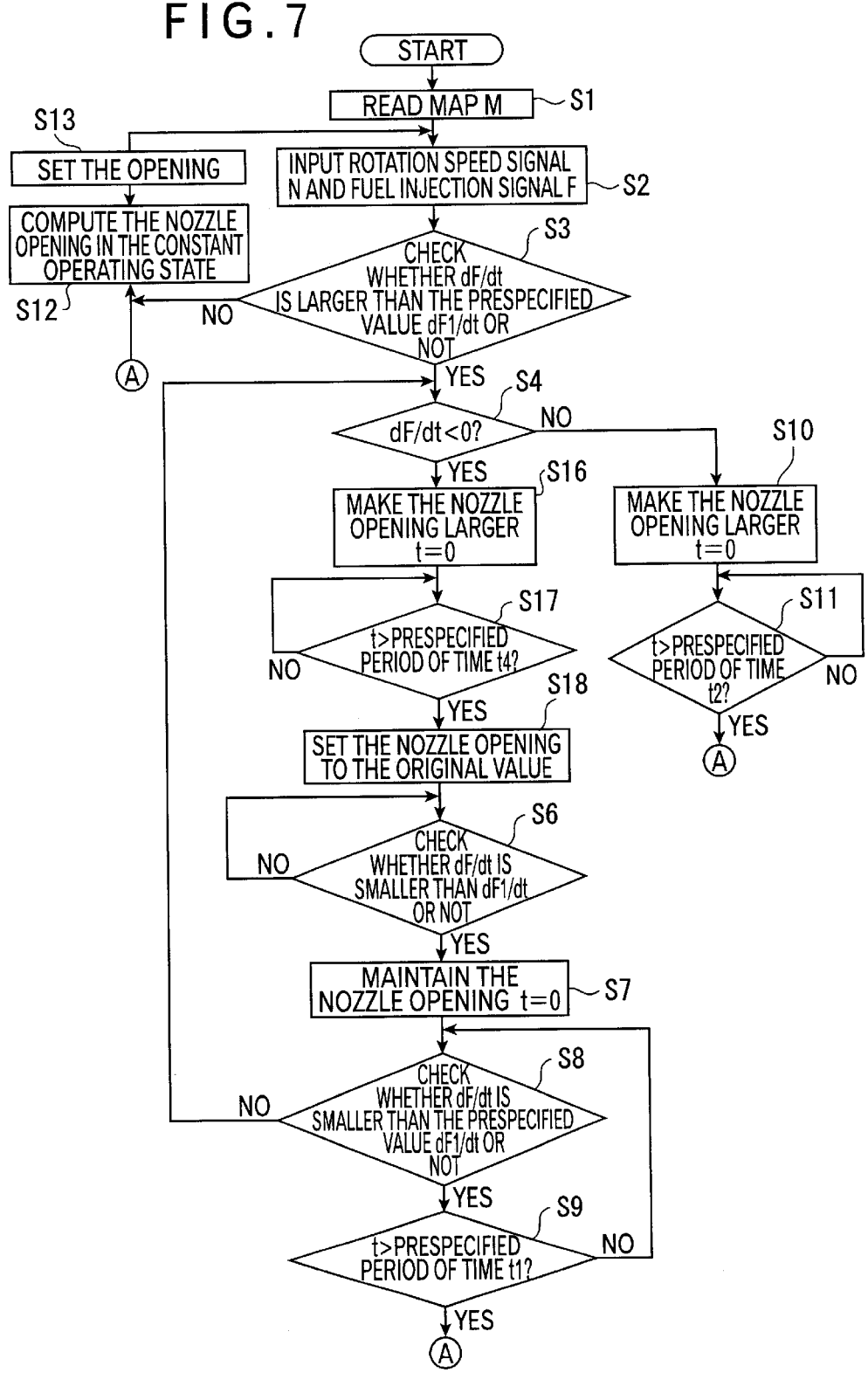
FIG. 7 is a flow chart showing controls for adjusting an opening of a variable nozzle according to a third embodiment of the present invention.

The third embodiment of the present invention is different from the first embodiment in controls during shift from the high load mode to the low load mode. FIG. 7 is a flow chart showing controls over an opening of a variable nozzle according to the third embodiment of the present invention.

In this figure, when it is determined in step 4 that the load change dF/dt is negative, the transitional response determination section 36 sends a signal indicating that the operating state of the diesel engine 1 is now shifting from the high load mode to the low load mode to the nozzle opening control section 37. The nozzle opening control section 37 receives this signal, and sets the incorporated timer to 0 (zero) in step S16, and outputs an instruction for setting the opening of the variable nozzle 15 to the maximum to the output section 32. With this, an opening of the variable nozzle 15 is set to the maximum value.

In step S17, the nozzle opening control section 37 monitors the time t for maintaining the opening of the variable nozzle 15 to the maximum value. When the maintaining time t reaches a prespecified period of time t4 as a second prespecified period of time, the nozzle opening control section 37 sets an opening of the variable nozzle 15 to the original one in the high load mode in step S18. Then like in the first embodiment, an opening of the variable nozzle 15 is maintained at the original value in the high load mode, returns to step S12, and sets the opening of the variable nozzle 15 to that in the constant operating state.

With the controls as described above, an opening of the variable nozzle 15 changes as shown in FIG. 12.

With the third embodiment of the present invention, in addition to the advantages (1), (2), and (3) provided in the first embodiment, the following advantages are provided.

(5) Namely, an opening of the variable nozzle 15 is maintained at the maximum value for the prespecified period of time t4 in the initial state after the operating mode of the diesel engine 1 is shifted from the high load mode to the low load mode, so that it is possible to prevent an operating region of the compressor 11 from reaching the surging limit with the operating mode shifted smoothly. Therefore the controls as described above are especially useful for an exhaust turbine supercharger used under the conditions when an operating region of the compressor 11 may reaches the surging limit just after the operating mode of the diesel engine 1 is shifted from the high load mode to the low load mode. The conventional technology could not be applied to an exhaust turbine supercharger in which an operating region of the compressor may reach the surging limit, but by providing controls according to the present invention, even in the case, by previously adjusting an opening of the variable nozzle 15, the operating mode can be shifted without allowing the operating region to reach the surging limit, so that an applicable area of the exhaust turbine supercharger 10 in the diesel engine 1 can be made larger.

It is to be noted that the present invention is not limited to the embodiments described above, and modifications and improvements for achieving the objects of the present invention are included within the scope of the present invention.

In each of the embodiments described above, when the operating mode shifts from the high load mode to the low load mode, an opening of the variable nozzle 15 is maintained at the original value in the high load mode, but the present invention is not limited to this case, and the opening of the variable nozzle 15 may be made smaller, or set to the minimum value. In this case, in the first and second embodiments, an opening of the variable nozzle 15 changes as indicated by the solid line in FIG. 13. Also in the third embodiment, the opening changes as indicated by a partially chain double-dashed line in FIG. 13. The controls as described above are especially useful, for instance, when the diesel engine 1 is used under the conditions where an opening of the variable nozzle 15 of the exhaust turbine supercharger 10 in the original high load mode has not fully be closed after the operating mode of the diesel engine 1 is shifted from the high load mode to the low load mode.

Determination as to whether the operating mode of the diesel engine 1 is shifting to the high load mode or to the low load mode is performed, in each of the embodiments described above, by computing the load from the rotation speed signal N and the fuel injection rate F in the engine body 2 and monitoring the load change dF/dt, but the present invention is not limited to this scheme. For instance, the configuration is allowable in which a torque gauge or a strain gauge is attached to the engine body 2 to directly monitor the load L or to monitor the load change dL/dt, or where the operating mode of the diesel engine 1 is determined only by monitoring the rotation speed of the engine body 2.

Although a period of time for maintaining an opening of the variable nozzle 15 is previously specified in each of the embodiments described above, but the present invention is not limited to this configuration, and the timing for changing an opening of the variable nozzle 15 may be set according to the load or the rotation speed.

Figure 14A:
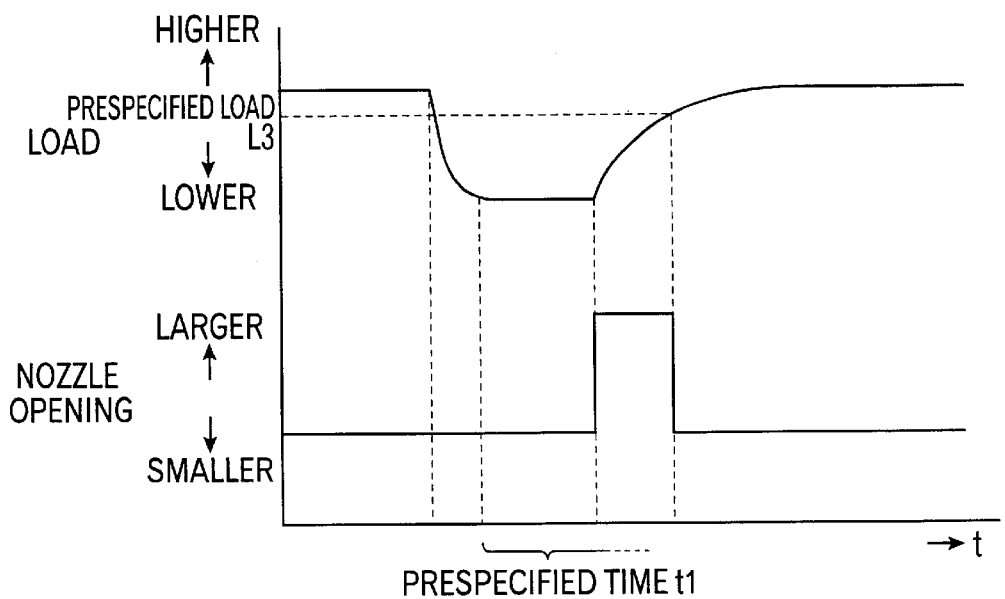
FIG. 14A and FIG. 14B are views showing variants of an opening of the variable nozzle according to the first embodiment of the present invention respectively.

For instance, when the load change is determined based on the load L measured with the torque gauge or the strain gauge in the first embodiment, the load change in the diesel engine 1 is expressed as shown in FIG. 14. Determination as to load when the operating mode of the diesel engine 1 shifts from the high load mode to the low load mode may be performed by comparing the absolute value of the load change dL/dt to the prespecified value dL1/dt.

Figure 14B:
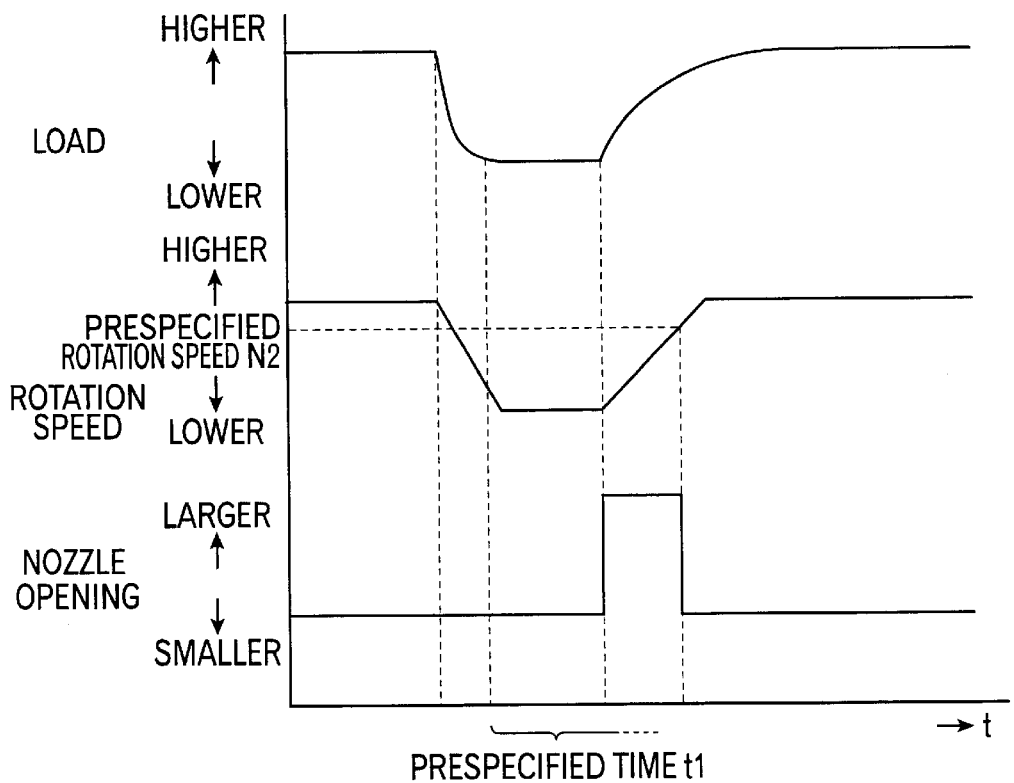

Further when the load L of the diesel engine 1 again shifts from the low load region to the high load region within the prespecified period of time t1, a prespecified load L3 may previously set as a third prespecified load so that, when the load L reaches the prespecified load L3, the opening of the variable nozzle 15 can be set to the preset opening. Also the configuration is allowable in which the opening of the variable nozzle 15 is changed at the timing not dependent of the load L, but on the rotation speed N as shown in FIG. 14(B). In this case, a prespecified rotation speed N2 may be set previously as a second prespecified rotation speed, so that the opening of the variable nozzle 15 can be changed when the rotation speed N reaches the prespecified rotation speed N2.

Figure 15A:
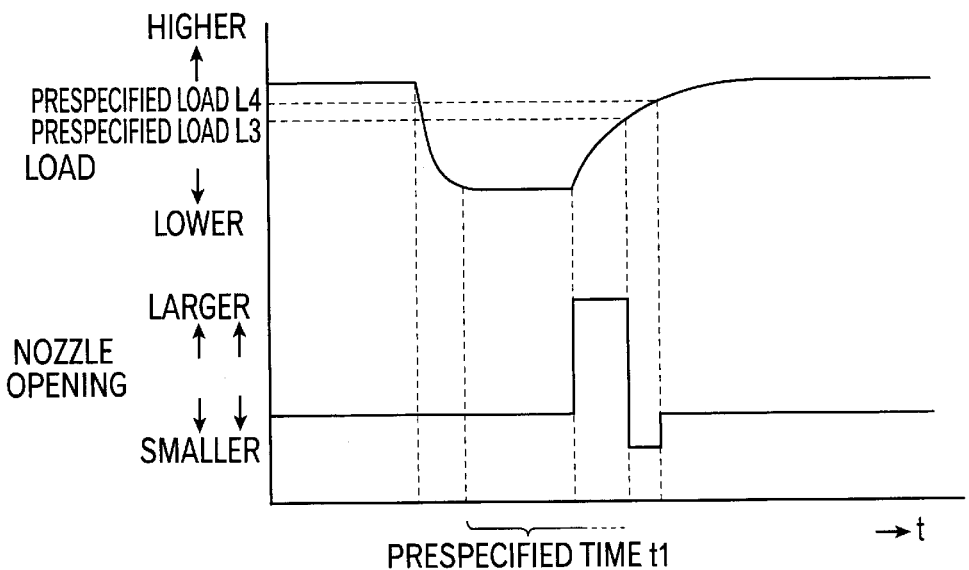
FIG. 15A and FIG. 15B are views showing variants of an opening of the variable nozzle according to the second embodiment of the present invention respectively.

Similarly, in the second embodiment, the timing for changing an opening of the variable nozzle 15 may be decided according to the load L or the rotation speed N. In this case, as shown in FIG. 15(A), the opening of the variable nozzle 15 is set to the maximum value when the load L of the diesel engine 1 again shifts from the low load region to the high load region within the prespecified period of time t1, and is changed to the minimum value (fully closed) when the load reaches the prespecified load level L3. Then, when the load L of the diesel engine 1 reaches a prespecified load L4 as a preset fourth prespecified load, the opening of the variable nozzle 15 is changed to the preset value.

Figure 15B:
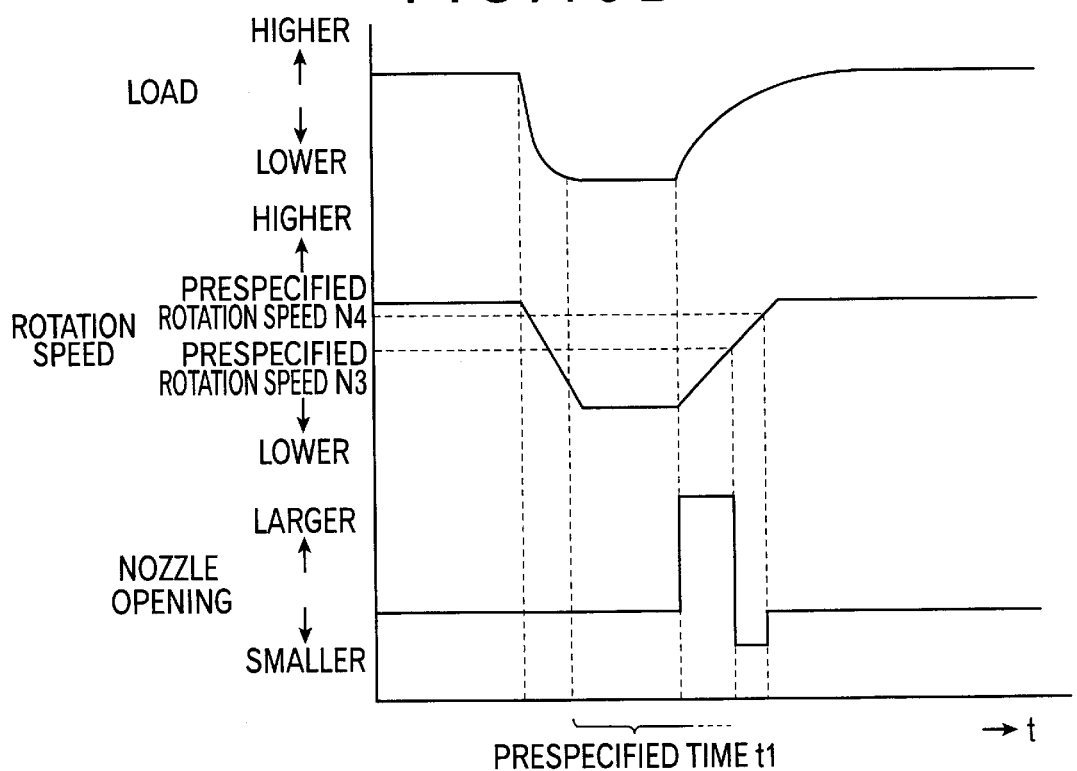

When the timing for changing an opening of the variable nozzle 15 is determined according to the rotation speed N, as shown in FIG. 15(B), until the rotation speed of the diesel engine 1 reaches a prespecified rotation speed N3 as a second prespecified rotation speed previously set, the variable nozzle 15 is fully opened. Then, the variable nozzle 15 is fully closed until the rotation speed reaches a prespecified rotation speed N4 as a third prespecified rotation speed previously set, and then the opening is changed to the preset value.

In the third embodiment, when the load of the diesel engine 1 shifts from the high load region to the low load region, an opening of the variable nozzle 15 is set to and maintained at the maximum value for the prespecified period of time t4, but the present invention is not limited to this configuration, and the opening of the variable nozzle 15 may be set to and maintained at the maximum value until the load reaches a prespecified load L5 as a second prespecified load previously set.

Figure 16A:
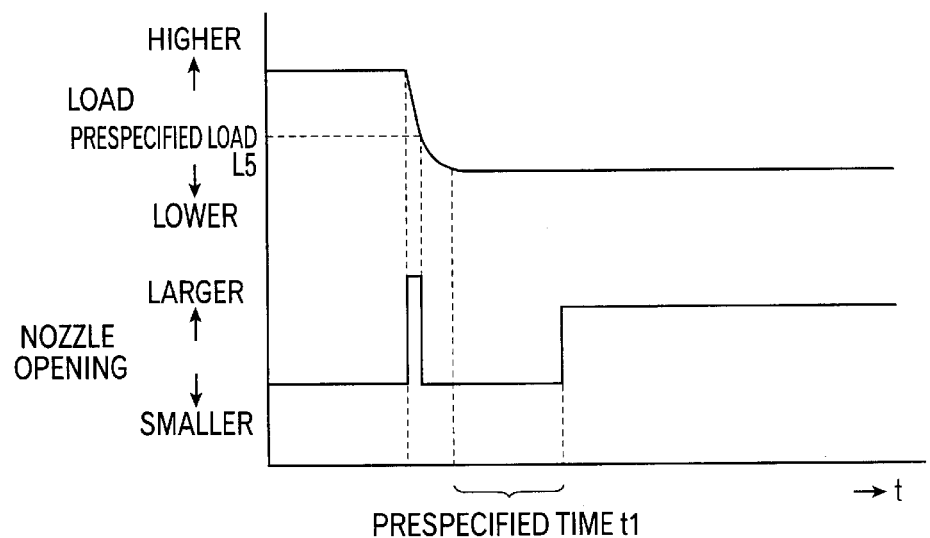
FIG. 16A and FIG. 16B are views showing variants of an opening of the variable nozzle according to the third embodiment of the present invention respectively.
Figure 16B:
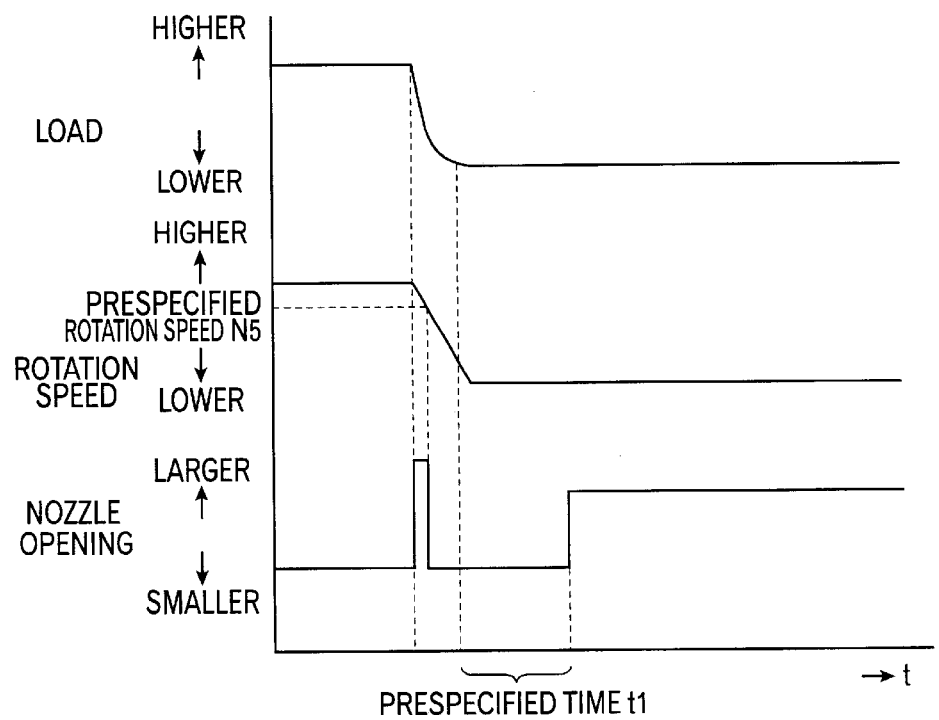

Alternatively, the opening of the variable nozzle 15 may be set to and maintained at the maximum value until the load reaches a prespecified rotation speed N5 as a first prespecified rotation speed previously set as shown in FIG. 16(B).

An opening of the variable nozzle 15 is controlled so that it is made larger or smaller when the load is shifted to the high load region or to the low load region respectively, but the opening may not always be set to and maintained at the maximum or minimum value as described in each of the embodiments above. Namely the range in which an opening of the variable nozzle 15 varies changes according to the conditions for use of the exhaust turbine supercharger 10 or diesel engine 1 or to other conditions, and an opening different from the maximum or minimum opening value may previously be set taking into considerations the conditions described above.

In each of the embodiments described above, the first prespecified period of time is the prespecified period of time t1, but the present invention is not limited to this configuration, and in a case where the time required for response can be estimated from the performance of the diesel engine 1 or the exhaust turbine supercharger 10 or use conditions thereof, a sum of the prespecified period of time t1 and the time required for response may be used as the prespecified period of time.

In each of the embodiments, the rotation speed signal N and the fuel injection signal F are obtained from the engine controller 25, but the present invention is not limited to this configuration, and for instance, the rotation speed or the fuel injection rate may be detected with sensors directly attached to the engine body 2.

In each of the embodiments described above, an opening of the variable nozzle 15 is decided according to a load and a rotation speed when the diesel engine 1 runs in the constant operating state, but the present invention is not limited to this configuration, and the opening of the variable nozzle 15 may be decided according only to the load.

The best mode and method of carrying out the present invention were described above, but the present invention is not limited to those described above. In other words, some specific embodiments of the present invention were illustrated and described above, but various modifications in terms of forms, materials, and other details of configuration can be made by those skilled in the art.

Therefore, the descriptions of the present invention including limitations or specifications of forms, materials, or other factors are only illustrative and provided so that the present invention can easily be understood, and these factors do not limit the present invention in any meaning, and descriptions removing some or all of the limitations over such factors as the forms or materials are included within the scope of the present invention.

What is claimed is:

1. A variable nozzle opening control unit for an exhaust turbine supercharger comprising:

a nozzle opening adjuster for adjusting an opening of a variable nozzle of said exhaust turbine supercharger;

a load detector for detecting a load of an internal combustion engine with said exhaust turbine supercharger connected thereto; and a control unit for controlling operations of said nozzle opening adjuster, wherein said control unit is previously set to provide controls so that an opening of said variable nozzle is set to and maintained at the substantially maximum value when the load of said internal combustion engine is in the low load region and also so iliac the opening of said variable nozzle is gradually made smaller, when the load is not less than a first prespecified load value, as the load becomes higher; and the opening of said variable nozzle in the original high load mode is maintained or made smaller, after the load of said internal combustion engine shifts from the high load region to the low load region, for a first prespecified period of time, and then is set to a preset opening after the first prespecified period of time has passed.

2. The variable nozzle opening control unit for an exhaust turbine supercharger according to claim 1 further comprising:

a rotation speed detector for detecting a rotation speed of said internal combustion engine, wherein said control unit provides controls so that an opening of said variable nozzle is made larger, when the load of said internal combustion engine shifts from the high load region to the low load region, or immediately after the rotation speed of said internal combustion engine is shifted from the high speed region to the low speed region, for a second prespecified period of time, or until a rotation speed of said internal combustion engine drops to a first prespecified rotation, speed, or until the load of said internal combustion engine drops to a second prespecified load level.

3. The variable nozzle opening control unit for an exhaust turbine supercharger according to claim 1, wherein said control unit provides controls so that the opening of said variable nozzle is made larger within said first prespecified period of time, when the load of said internal combustion engine again shifts from the low load region to the high load region, or when the rotation speed of said internal combustion engine again shifts from the low speed region to the high speed region, for a third prespecified period of time, or until the rotation speed of said internal combustion engine reaches thee second prespecified period of time, or until the load of raid internal combustion engine reaches the third prespecified load, and also so that the opening is set to a prespecified value after said third prespecified period of time has passed, or after the rotation speed of said combustion engine reaches the second prespecified rotation speed, or after the load reaches the third prespecified load level.

4. The variable nozzle opening control unit for an exhaust turbine supercharger according to claim 1, wherein said control unit provides controls, within said first prespecified period of time, so that the opening of the variable nozzle is made larger, when the load of said internal combustion engine again shifts from the low load region to the high load region, or when the rotation speed of said internal combustion engine again shifts from the low speed region to the high speed region, for a third prespecified period of time, or until ice rotation speed of said internal combustion engine reaches the second prespecified rotation speed, or until the load of said internal combustion engine reaches the third load level, and also so that the opening of the variable nozzle is made smaller after said third prespecified period of time has passed, or after the rotation speed reaches the accord prespecified rotation speed, or after the load reaches the third prespecified load level, for a fourth prespecified period of time, or until the rotating speed reaches the third prespecified rotation speed, or until the load reaches the fourth prespecified load, and further so that the opening is set to a preset value after said fourth prespecified period of time has passed, or after the rotation speed reaches the third prespecified rotation speed, or after the load reaches the fourth prespecified load level.

* * * * *